US011120002B2

(12) United States Patent
Bortnikov et al.

(10) Patent No.: US 11,120,002 B2
(45) Date of Patent: Sep. 14, 2021

(54) METHOD AND SYSTEM FOR CONCURRENT DATABASE OPERATION

(71) Applicant: Yahoo Holdings, Inc., Sunnyvale, CA (US)

(72) Inventors: Edward Bortnikov, Haifa (IL); Anastasia Braginsky, Haifa (IL); Eshcar Hillel, Binyamina (IL); Guy Gueta, Holon (IL); Dmitry Basin, Petah Tikva (IL); Moshe Sulamy, Haifa (IL)

(73) Assignee: Verizon Media Inc., New York, NY (US)

( * ) Notice: Subject to any disclaimer, the term of this patent is extended or adjusted under 35 U.S.C. 154(b) by 529 days.

(21) Appl. No.: 15/214,901

(22) Filed: Jul. 20, 2016

(65) Prior Publication Data

US 2018/0025047 A1    Jan. 25, 2018

(51) Int. Cl.
*G06F 17/00* (2019.01)
*G06F 16/23* (2019.01)

(52) U.S. Cl.
CPC .............................. *G06F 16/2308* (2019.01)

(58) Field of Classification Search
CPC ......... G06F 17/30377; G06F 17/30348; G06F 17/30303; G06F 16/2308
See application file for complete search history.

(56) References Cited

U.S. PATENT DOCUMENTS

| | | | | |
|---|---|---|---|---|
| 5,717,918 A | * | 2/1998 | Takayama | G06F 16/24557 |
| 8,504,758 B1 | * | 8/2013 | McHugh | G06F 17/30117 |
| | | | | 711/100 |
| 9,069,960 B1 | * | 6/2015 | Kumar | G06F 21/56 |
| 2005/0289188 A1 | * | 12/2005 | Nettleton | G06F 17/30008 |
| 2006/0230013 A1 | * | 10/2006 | Hrle | G06F 16/2453 |
| 2007/0198792 A1 | * | 8/2007 | Dice | G06F 12/0815 |
| | | | | 711/163 |
| 2008/0065669 A1 | * | 3/2008 | Factor | G06F 16/9027 |
| 2011/0051186 A1 | * | 3/2011 | Katsuda | H04N 1/00244 |
| | | | | 358/1.15 |
| 2013/0041872 A1 | * | 2/2013 | Aizman | G06F 16/182 |
| | | | | 707/690 |
| 2013/0111187 A1 | * | 5/2013 | Liu | G06F 3/0673 |
| | | | | 711/216 |
| 2014/0330767 A1 | * | 11/2014 | Fowler | G06F 9/466 |
| | | | | 707/607 |
| 2014/0379638 A1 | * | 12/2014 | Li | G06F 17/30575 |
| | | | | 707/610 |
| 2016/0041885 A1 | * | 2/2016 | Arai | G06F 11/1451 |
| | | | | 714/19 |
| 2016/0117779 A1 | * | 4/2016 | Sale | G06Q 40/08 |
| | | | | 705/4 |
| 2016/0179408 A1 | * | 6/2016 | Endo | G06F 3/0659 |
| | | | | 709/202 |

(Continued)

*Primary Examiner* — Hasanul Mobin
(74) *Attorney, Agent, or Firm* — Venable LLP

(57) ABSTRACT

The present teaching relates to concurrent database operation. In one example, a plurality of requests which includes a scan request to obtain first data associated with a plurality of first keys stored in a database is received concurrently. A global version number is updated upon receipt of the scan request. The first data associated with the plurality of first keys is obtained based on the updated global version number. The first data is provided in response to the scan request.

20 Claims, 15 Drawing Sheets

(56) References Cited

U.S. PATENT DOCUMENTS

2016/0350357 A1* 12/2016 Palmer ................ G06F 16/2315
2017/0091651 A1*  3/2017 Miao ......................... G06F 8/71
2017/0192970 A1*  7/2017 Aasheim ................. H04L 67/26

* cited by examiner

METHOD AND SYSTEM FOR CONCURRENT DATABASE OPERATION

BACKGROUND

1. Technical Field

The present teaching relates to methods, systems, and programming for concurrent database operation. Particularly, the present teaching is directed to methods and systems of processing a plurality of requests for retrieving and/or updating data in the database concurrently.

2. Discussion of Technical Background

A database may store a huge amount of data as pairs of a key and a value. One or more users may request to access the database by transmitting a plurality of requests concurrently through one or more client devices (e.g., desktops, laptops, etc.) to a database operation engine via a network for performing concurrent database operations. The plurality of requests may include one or more scan requests, one or more get requests, and one or more put requests. Specifically, each scan request may be to retrieve all values of a range of keys stored in the database specified in the scan request. Each get request may be to retrieve a value associated with a key stored in the database. Each put request may be to update the database with data associated with a key specified in the put request. Accordingly, the desirable database operation engine may perform, concurrently, a scan operation, a get operation, and a put operation in response to each scan request, each get request, and each put request, respectively.

Two existing methods are used for database operations when a plurality of requests are received concurrently in order to avoid a conflict between retrieving data from the database (e.g., when performing a scan operation or a get operation) and updating the data in the database (e.g., when performing a put operation). In one method, only one operation can be performed at any given time by locking the database so that other operations cannot access the database. After the operation is completed, the database is unlocked so that another operation may be performed on the database before locked again. This method results in a very long processing time, particularly when a huge number of requests are received concurrently. In the other method, a new data version is created upon receipt of a put request. This is done so that each put operation may be performed on the new data version without disturbing the scan operation or the get operation. As a result, the plurality of requests that received concurrently may be processed concurrently as well. However, the version management overhead is significantly large particularly when the number of put requests is much greater than the number of scan requests and the number of get requests.

Therefore, there is a need to provide an improved solution for concurrent database operations to solve the above-mentioned problems.

SUMMARY

The present teaching relates to methods, systems, and programming for concurrent database operations. Particularly, the present teaching is directed to methods and systems of processing a plurality of requests for retrieving and/or updating data in the database concurrently.

In an example, a method, implemented on a machine having at least one processor, storage, and a communication platform connected to a network for database operation is disclosed. A plurality of requests which includes a scan request to obtain first data associated with a plurality of first keys stored in a database is received concurrently. A global version number is updated upon receipt of the scan request. The first data associated with the plurality of first keys is obtained based on the updated global version number. The first data is provided in response to the scan request.

In another example, a system, having at least one processor, storage, and a communication platform connected to a network for database operation is disclosed. The system comprises a request classifier and a data scanner. The request classifier is configured to receive, concurrently, a plurality of requests, and classify each of the plurality of requests into one of a scan request to obtain first data associated with a plurality of first keys stored in a database, a get request to obtain second data associated with a second key stored in the database, and a put request to update third data associated with a third key stored in the database, wherein the plurality of requests includes the scan request. The data scanner is configured to receive the scan request from the request classifier, update a global version number upon receipt of the scan request, obtain the first data associated with the plurality of first keys based on the updated global version number, and providing the first data in response to the scan request.

Other concepts relate to software for implementing the present teaching on database operation. A software product, in accord with this concept, includes at least one machine-readable non-transitory medium and information carried by the medium. The information carried by the medium may be executable program code data, parameters in association with the executable program code, and/or information related to a user, a request, content, or information related to a database, etc.

In one example, a machine-readable tangible and non-transitory medium having information for database operation is disclosed. The information, when read by the machine, causes the machine to perform the following. A plurality of requests which includes a scan request to obtain first data associated with a plurality of first keys stored in a database is received concurrently. A global version number is updated upon receipt of the scan request. The first data associated with the plurality of first keys is obtained based on the updated global version number. The first data is provided in response to the scan request.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
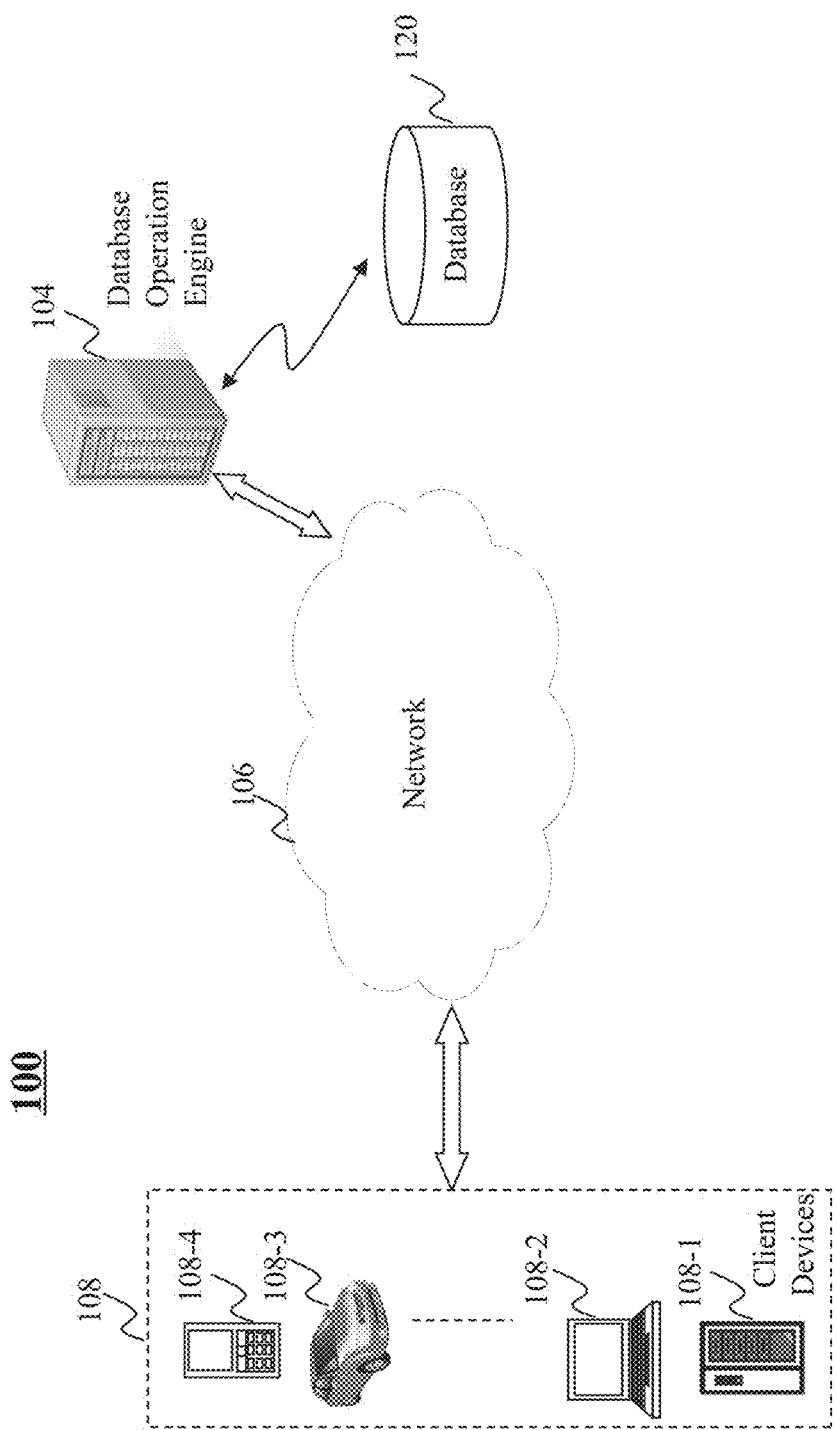
FIG. 1 is a high level depiction of an exemplary system for performing database operations, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present teaching relates to methods, systems, and programming for concurrent database operations. Particularly, the present teaching is directed to methods and systems of processing a plurality of requests for retrieving and/or updating data in the database concurrently. For example, the plurality of requests may include a scan request. The plurality of requests may further include one or more get requests and/or put requests. Upon receipt of the scan request rather than the put request, a global version number may be updated. For example, the global version number may be retrieved from the database and increased upon receipt of the scan request. The scan operation may be performed to obtain data associated with a plurality of keys based on the updated global version number. Specifically, in the scan operation, a value of each of the plurality of first keys associated with the corresponding relevant version number may be retrieved. The corresponding relevant version number associated with each first key may be the largest version number below the updated global version number that is associated with the first key.

Comparing with the prior method that creates a new data version upon every update (e.g., a put operation in response to a put request), the disclosed method updates the global version number upon receipt of every scan request rather than every put request, which results in a reduced version management overhead since performing a scan operation, in practice, retrieves a big amount of data and takes longer than performing a put operation.

Further, both the scan operation and the get operation are wait-free, and the put operation is lock-free according to various embodiments of the present teaching as disclosed below. An operation is wait-free meaning that the operation will eventually make progress or will be completed within a finite number of steps. An operation is lock free meaning that when a plurality of the operations is received concurrently, at least one of the plurality of operations will make progress. This is advantageous, because when a plurality of scan requests, get requests, and put requests are received concurrently, the scan operations, the get operations, and the put operations may be performed concurrently in a very effective manner. Specifically, the scan operations and the get operations may be performed in parallel (i.e., wait-free), however, the put operations may be performed consecutively (i.e., lock-free).

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary system 100 for performing database operations, according to an embodiment of the present teaching. In FIG. 1, the exemplary system 100 includes one or more client devices 108, a network 106, a database operation engine 104, and a database 120.

Figure 5:
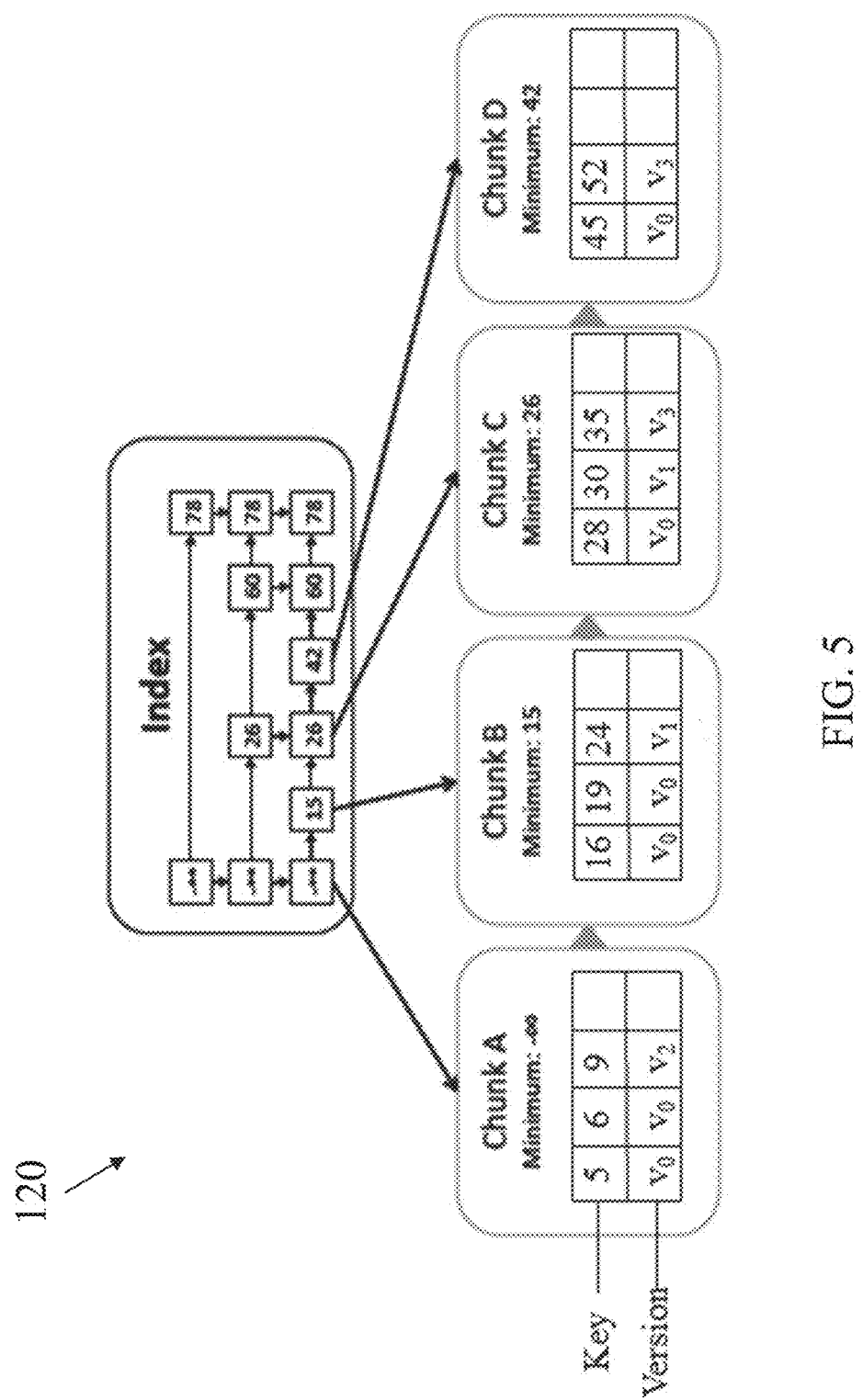
FIG. 5 is an exemplary data structure of a database, according to an embodiment of the present teaching.

The database 120 may include a plurality of data (e.g., (key, value) pairs) each corresponding to a version number. The plurality of (key, value) pairs may be organized using a data structure as shown in FIG. 5. In addition to the plurality of (key, value) pairs, the database 120 further include a global version number, a pending-puts array (PPA), and a scanning-thread array (STA) used in the concurrent database operations (not shown). The global version number may be served as a reference time stamp when performing the database operations. The PPA includes one or more entries each corresponding to a put request that has not been processed. The STA includes one or more entries each corresponding to a scan request (either processed or unprocessed). Each entry in the PPA and STA has a version number determined based on the global version number when the PPA and/or STA is updated. More details about the global version number, the PPA, and the STA will be discussed in FIGS. 6-13.

The one or more client devices 108 may be one or more computing devices connected to the network 106, which may include, but not limited to, a desktop computer 108-1, a laptop computer 108-2, a built-in device in a motor vehicle 108-3, or a mobile phone 108-4. The one or more client devices 108 may be used to transmit a plurality of requests for database operations concurrently to the database operation engine 104 via the network 100. Each of the plurality of requests may be one of the scan request, the get request, and the put request. As described above, the scan request may be to retrieve all values of a range of keys. In an embodiment, the scan request may specify a maximal key and a minimal key. Accordingly, the scan request is to retrieve all values of the keys between the maximal key and the minimal key. The get request is to retrieve a value associated with a key specified in the get request. The put request is to update the database with the data, e.g., a (key, value) pair specified in the put request. In an embodiment, the put request may be to add the (key, value) pair in the database if the key is absent in the database. In an embodiment, the put request may be to update the value of the key in the database based on the (key, value) pair if the key exists in the database but has an old value. The plurality of requests may be submitted to the one or more client devices 108 by one or more users at the same time or within a predetermined short period of time. The one or more client devices 108 may receive data from the database operation engine 104 corresponding to each scan request and/or each get request. Alternatively or additionally, the one or more client devices 108 may further receive a confirmation from the database operation engine 104 corresponding to each put request.

The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof.

The database operation engine 104 may receive the plurality of requests concurrently or within the predetermined short period of time, access the database 120 directly, and perform a scan operation, a get operation, and a put operation concurrently with respect to the database 120, in response to each scan request, each get request, and each put request, respectively. Further, the database operation engine 104 may transmit the data back to the one or more client devices 108 in response to each scan operation and each get operation. Additionally or alternatively, the database operation engine 104 may transmit a confirmation in response to each put request.

Figure 2:
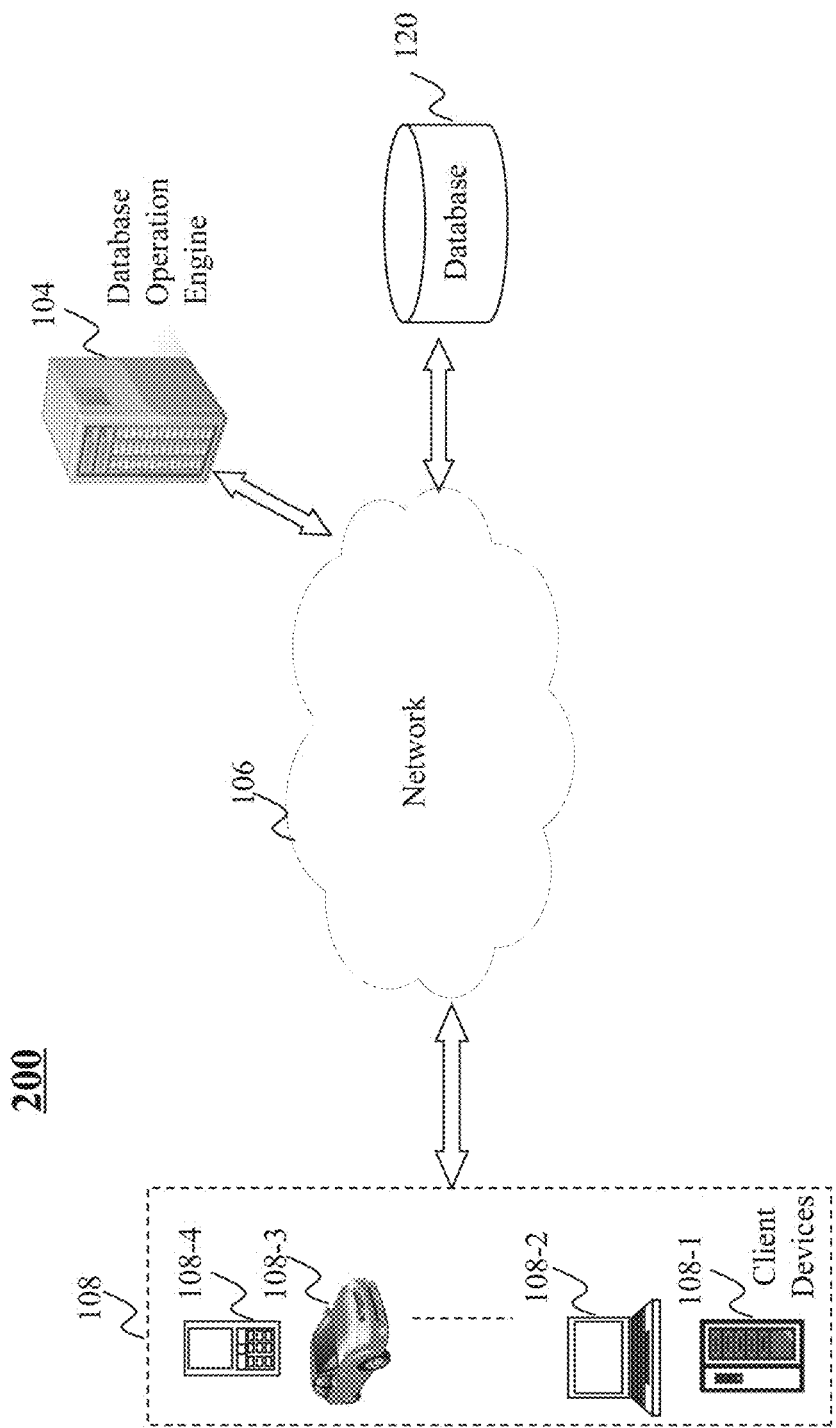
FIG. 2 is a high level depiction of an exemplary system for performing database operations, according to an embodiment of the present teaching.

FIG. 2 is a high level depiction of another exemplary system 200 for concurrent database operations, according to an embodiment of the present teaching. The exemplary system 200 in this embodiment is similar to the exemplary system 100 in FIG. 1, except that the database 120 in this embodiment is directly connected to the network. This is configured such that multiple database operation engines 104 may be able to access the database 120 at the same time via the network 106.

Figure 3:
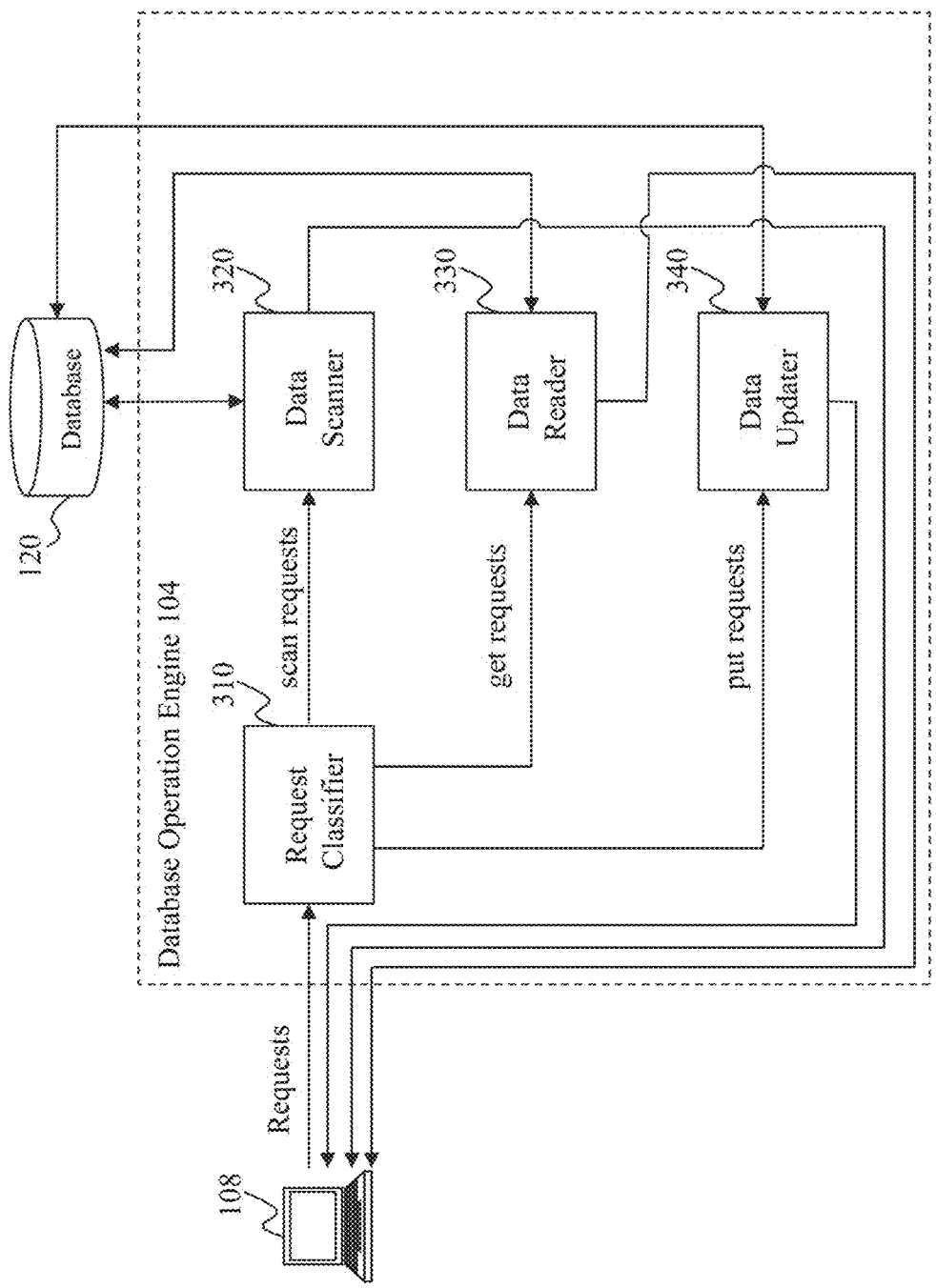
FIG. 3 illustrates an exemplary diagram of a database operation engine, according to an embodiment of the present teaching.

FIG. 3 illustrates an exemplary diagram of the database operation engine 104, according to an embodiment of the present teaching. The database operation engine 104 includes a request classifier 310, a data scanner 320, a data reader 330, and a data updater 340.

The request classifier 310 may be configured to receive a plurality of requests concurrently from one or more client devices 108. In an embodiment, the plurality of requests may be submitted to the one or more client devices 108 by one or more users at the same time or within a predetermined short period of time. The request classifier 310 may be further configured to classify the plurality of requests. Specifically, the request classifier 310 may be further configured to classify each of the plurality of requests into one of the scan request, the get request, and the put request. The scan request may be to retrieve all values of a range of keys. In an embodiment, the scan request may specify a maximal key and a minimal key. Accordingly, the scan request is to retrieve all values of the keys between the maximal key and the minimal key. The get request may be to retrieve a value associated with a key specified in the get request. The put request may be to update the database with the data associated with the key pair specified in the put request. In an embodiment, the put request may be to add the data including the key and the associated value in the database if the key is absent in the database. In an embodiment, the put request may be to update the value of the key based on the data if the key exists in the database but has an old value. Finally, the request classifier 310 may be further configured to transmit each scan request to the data scanner 320, each get request to the data reader 330, and each put request to the data updater 340.

The data scanner 320 may be coupled to the request classifier 310 and the one or more client devices 108. In addition, the data scanner 320 may be assessable to the database 120. The data scanner 320 may be configured to perform a scan operation to retrieve first data associated with the range of keys specified in each scan request. The first data may include all the values of the range of keys specified in each scan request. The data scanner 320 may be further configured to output the first data, e.g., back to the one or more client devices 108.

The data reader 330 may be coupled to the request classifier 310 and the one or more client devices 108. In addition, the data reader 330 may be assessable to the database 120. The data reader 330 may be configured to perform a get operation to retrieve second data associated with a key specified in each get request. The second data may include the value stored in the database associated with the key specified in each get request. The data reader 330 may be further configured to output the second data, e.g., back to the one or more client devices 108.

The data updater 340 may be coupled to the request classifier 310 and the one or more client devices 108. In addition, the data updater 340 may be assessable to the database 120. The data updater 340 may be configured to perform a put operation to update the database with third data associated with the key specified in each put request. The data updater 340 may be further configured to output a confirmation, e.g., to the one or more client devices, when each put operation is completed.

It is appreciated that upon receipt of the corresponding requests, the data scanner 320, the data reader 330, and the data updater 340 may perform the scan operations, the get operations, and the put operations, concurrently. In an embodiment, the data scanner 320 and the data reader 330 may perform the scan operations and the put operations in parallel (i.e., wait free). In the meanwhile, the data updater 340 may perform the put operations consecutively (i.e., lock free).

Figure 4:
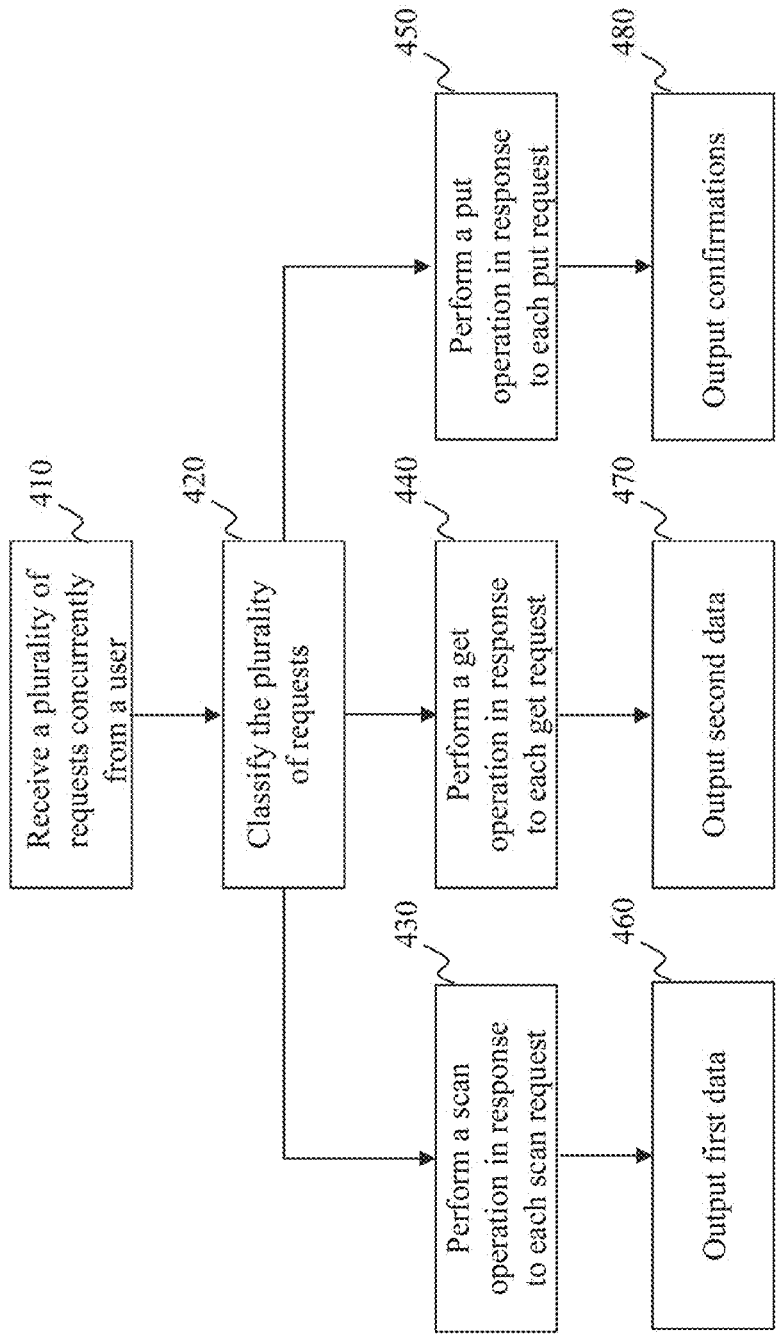
FIG. 4 is a flowchart of an exemplary process for performing database operations in response to a plurality of concurrent requests, according to an embodiment of the present teaching.

FIG. 4 is a flowchart of an exemplary process for performing database operations in response to a plurality of concurrent requests, according to an embodiment of the present teaching. The process as shown in FIG. 4 may be performed by various components of the database operation engine 104 in FIG. 3.

At step 410, a plurality of requests may be received concurrently from one or more client devices 108. In an embodiment, the plurality of requests may be submitted to the one or more client devices 108 by one or more users at the same time or within a predetermined short period of time. At step 420, the plurality of requests may be classified. Specifically, each of the plurality of requests may be classified into one of the scan request, the get request, and the put request. The scan request may be to retrieve all values of a range of keys. In an embodiment, the scan request may specify a maximal key and a minimal key. Accordingly, the scan request may be to retrieve all values of the keys between the maximal key and the minimal key. The get request may be to retrieve a value associated with a key specified in the get request. The put request may be to update the database with the data associated with the key pair specified in the put request. In an embodiment, the put request may be to add the data including the key and the associated value in the database if the key is absent in the database. In an embodiment, the put request may be to update the value of the key based on the data if the key exists in the database but has an old value.

After step 420 is completed, steps 430, 440, and 450 may be performed concurrently. In an embodiment, a plurality of scan operations and/or put operations may be performed in parallel at steps 430, and 440. In the meanwhile, a plurality of put operations may be performed consecutively at step 450.

Specifically, at step 430, a scan operation is performed to retrieve first data associated with the range of keys specified in each scan request. The first data may include all the values of the range of keys specified in each scan request. At step 460, the first data is outputted. At step 440, a get operation is performed to retrieve second data associated with a key specified in each get request. The second data may include the value stored in the database associated with the key specified in each get request. At step 470, the second data is outputted. At step 450, a put operation is performed to update the database with the third data associated with the key specified in each put request. At step 480, a confirmation is outputted when each put operation is completed.

FIG. 5 is an exemplary data structure of the database 120, according to an embodiment of the present teaching. As shown, the data structure includes a plurality of chunks (e.g., Chunk A, Chunk B, Chunk C, and Chunk D as shown in FIG. 5) used for storing the data in the database 120. Each chunk includes a memory or storage that stores a portion of data in the database 120. In an embodiment, each chunk includes a plurality of cells, each of which has a certain amount of memory that stores a key, a value associated with the key (not shown), and a version number. Accordingly, a chunk including a larger number of cells has a larger memory than another chunk including a smaller number of cells. In an embodiment, a key may have two or more version numbers and two or more corresponding values (which may be the same or different).

The chunks in the data structure are configured such that each chunk has an non-overlapped range of keys with another chunk. Further, the lower bound of keys in each chunk is indicated by the corresponding index number as shown in FIG. 5 by arrows, and the upper bound the keys in the chunk is indicated by the index number of the adjacent chunk (e.g., the right chunk as shown in FIG. 5). For example, as shown in FIG. 5, chunks A, B, C, and D correspond to the index numbers of −∞, 15, 26, and 42, respectively. This indicates that the keys in chunk A fall in the range of (−∞, 15), the keys in chunk B fall in the range of [15, 26), the keys in chunk C fall in the range of [26, 41), and the keys in chunk D fall in the range of [42, 60). Given a specific key specified in any one of the scan request, the get request, and the put request, such configuration of the data structure may result in an effective and efficient process of locating a chunk that may store the specific key through the index of the data structure. Further, the number of chunks in the data structure is scalable and non-limiting as long as there is enough storage or memory for the data structure.

Figure 6:
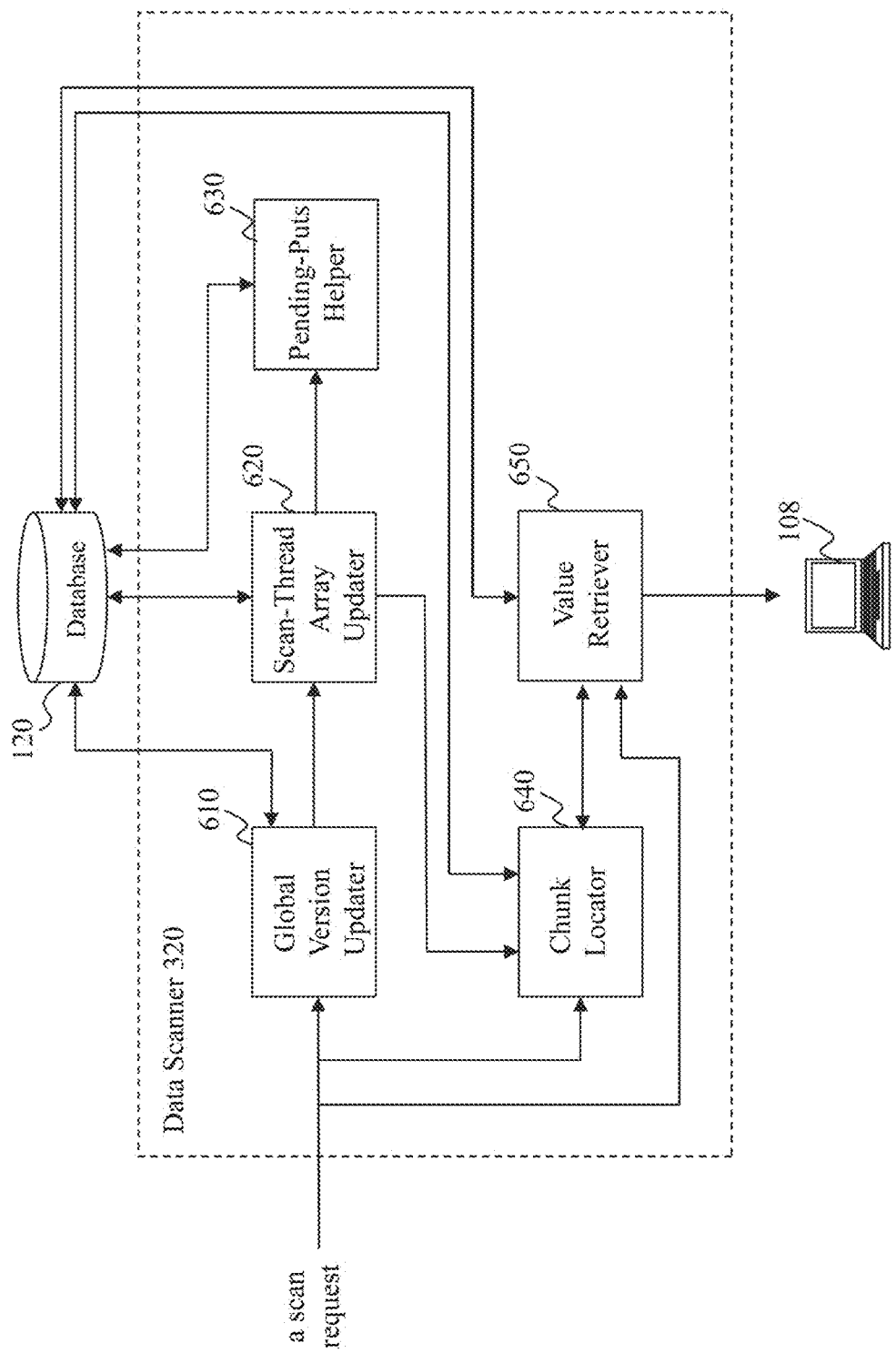
FIG. 6 illustrates an exemplary diagram of a data scanner, according to an embodiment of the present teaching.

FIG. 6 illustrates an exemplary diagram of the data scanner 320, according to an embodiment of the present teaching. The data scanner 320 includes a global version updater 610, a scan-thread array updater 620, a pending-puts helper 630, a chunk locator 640, and a value retriever 660, all of which are accessible to the database 120.

The global version updater 610 may be coupled to the scan-thread array updater 620 and configured to obtain a scan request, e.g., from the request classifier 310. The scan request may be to retrieve all values of a range of keys. In an embodiment, the scan request may specify a maximal key and a minimal key. Accordingly, the scan request is to retrieve all values of the keys between the maximal key and the minimal key. The global version updater 610 may be further configured to update a global version number in the database 120. In an embodiment, the global version number may be retrieved from the database 120 and incremented. In an embodiment, the global version number may represent a referent time point.

The scan-thread array updater 620 may be coupled to the global version updater 610, the pending-puts helper 630, and the chunk locator 640. The scan-thread array updater 620 may be configured to publish the scan request as an entry in the STA. The scan-thread array updater 620 may be further configured to assign the global version number to the entry of the STA corresponding to the scan request.

The pending-puts helper 630 may be coupled to the scan-thread array updater 620 and configured to read each entry of the PPA. The pending-puts helper 630 may be further configured to determine whether the read entry of the PPA has a valid version number. If not, the pending-puts helper 630 may be further configured to assign the global version number to the entry of the PPA.

The chunk locator 640 may be coupled to the scan-thread array updater 620 and the value retriever 650 and configured to locate a chunk that may store each key specified in the scan request (or the entry of the STA) in the data structure (e.g., the data structure in FIG. 5) through index.

The value retriever 650 may be coupled to the chunk locator 640 and in communication with the one or more client devices 108. The value retriever 650 may be configured to obtain each key related to the scan request from the entry of the STA. The value retriever 650 may be further configured to retrieve the value of each key with a corresponding relevant version number. In an embodiment, the relevant version number associated with a key may be the most recent version number associated with the key that is prior to the time stamp represented by the version number of the entry of the STA corresponding to the scan request. In an embodiment, the relevant version number associated with the key may be the largest version number below the version number of the entry of the STA corresponding to the scan request. In some examples, the version number of the entry of the STA may be the updated global version number. Optionally, the value retriever 650 may be further configured to assign the updated global version number to each of the keys identified in the scan request. Finally, the value retriever 650 may be configured to output the values of the keys in response to the scan request.

Figure 7:
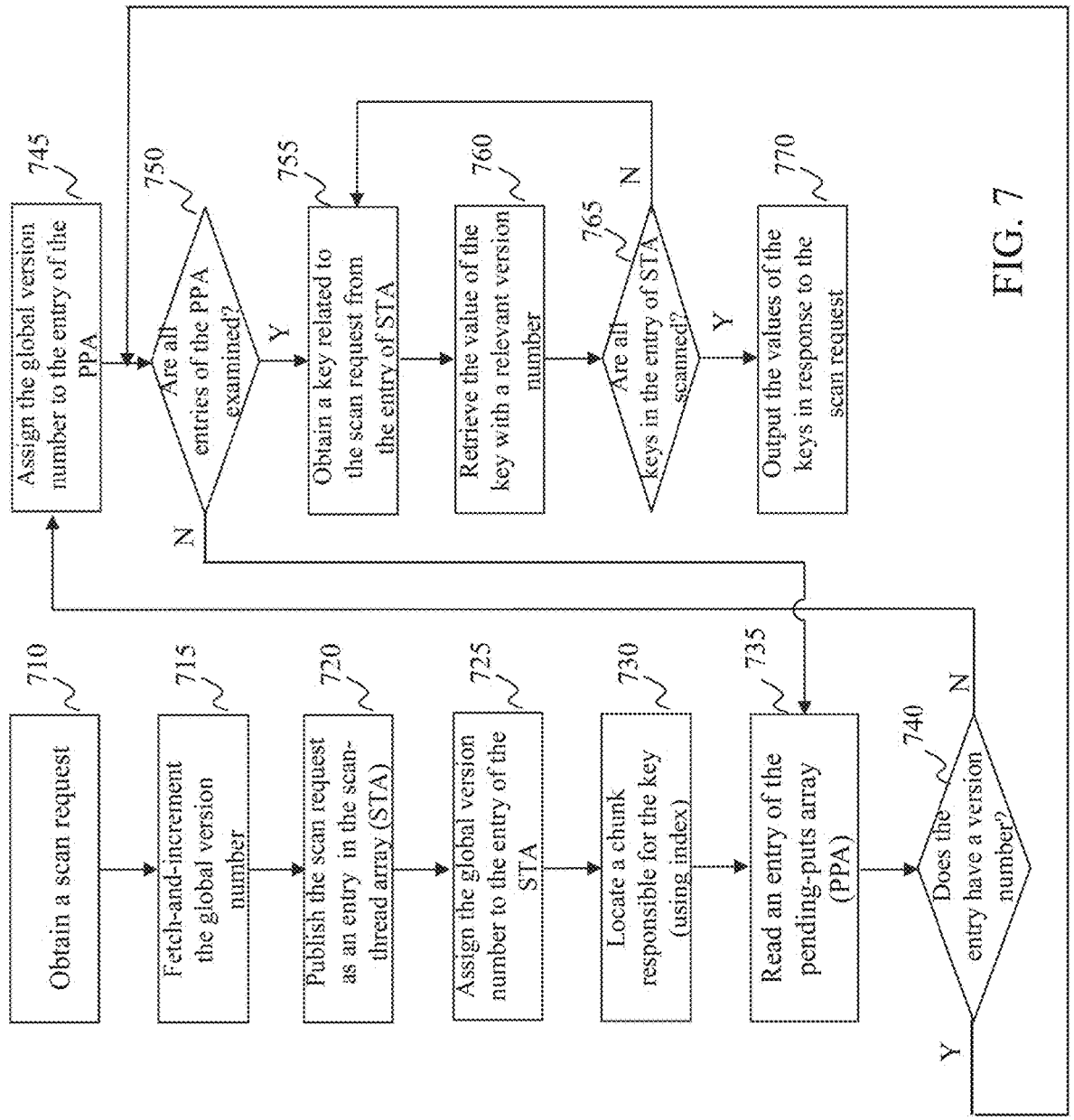
FIG. 7 is a flowchart of an exemplary process for performing a scan operation in response to a scan request, according to an embodiment of the present teaching.

FIG. 7 is a flowchart of an exemplary process for performing a scan operation in response to a scan request, according to an embodiment of the present teaching. The process described in FIG. 7 may be performed in the data scanner 320. As described above, a plurality of scan operations may be performed using the method in FIG. 7 in parallel.

At step 710, a scan request may be obtained, e.g., from the request classifier 310. The scan request may be to retrieve all values of a range of keys. In an embodiment, the scan request may specify a maximal key and a minimal key. Accordingly, the scan request is to retrieve all values of the keys between the maximal key and the minimal key. At step 715, a global version number in the database 120 may be updated. In an embodiment, the global version number may be retrieved from the database 120 and incremented. In an embodiment, the global version number may represent a reference time stamp. At step 720, the scan request may be published as an entry in the STA. At step 725, the global version number is assigned to the entry of the STA corresponding to the scan request.

At step 730, a chunk that may store the key specified in the scan request (or the entry of the STA) may be located in the data structure (e.g., the data structure in FIG. 5) through index. At step 735, an entry of the PPA may be read. At step 740, it is determined whether the entry of the PPA has a valid version number. If so, the process proceeds to step 750. Otherwise, the process proceeds to step 745.

At step 745, the global version number may be retrieved from the database and assigned to the entry of the PPA. At step 750, it is determined whether all entries of the PPA have been examined. If so, the process proceeds to step 755. Otherwise, the process returns to step 735. Sometimes, the steps 735, 740, 745, and 750 may be collectively referred to a sub-process for helping pending put operations.

At step 755, a key related to the scan request may be obtained from the entry of the STA. At step 760, the value of the key with a relevant version number may be retrieved. In an embodiment, the relevant version number associated with the key may be the most recent version number associated with the key that is prior to the time stamp represented by the version number of the entry of the STA corresponding to the scan request. In an embodiment, the relevant version number associated with the key may be the largest version number below the version number of the entry of the STA corresponding to the scan request. In some examples, the version number of the entry of the STA may be the updated global version number. Optionally, the updated global version number may be assigned to the key.

At step 765, it is determined whether all the keys in the scan request (or the entry of the STA corresponding to the scan request) have been scanned. If so, the process proceeds to step 770. Otherwise, the process returns to step 755. At step 770, the values of the keys may be outputted in response to the scan request, e.g., back to the one or more client devices 108.

Figure 8:
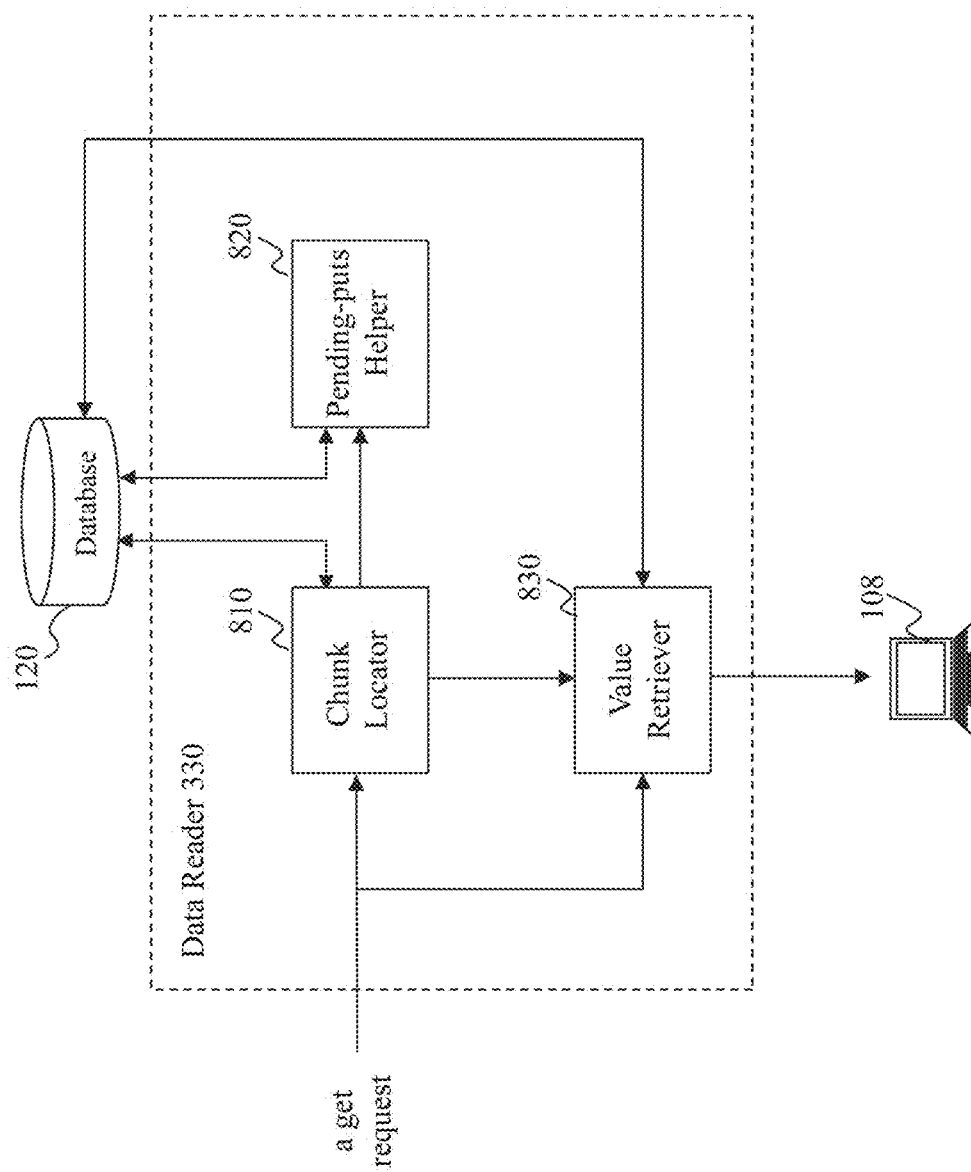
FIG. 8 illustrates an exemplary diagram of a data reader, according to an embodiment of the present teaching.

FIG. 8 illustrates an exemplary diagram of the data reader 330, according to an embodiment of the present teaching. The data reader 330 includes a chunk locator 810, a pending-puts helper 820, and a value retriever 830, all of which are accessible to the database 120.

The chunk locator 810 may be coupled to pending-puts helper 820 and the value retriever 830 and configured to obtain a get request. The get request may be to retrieve a value associated with a key specified in the get request. The chunk locator 810 may be further configured to locate a chunk that may store the key specified in the scan request (or the entry of the STA) in the data structure (e.g., the data structure in FIG. 5) through index.

The pending-puts helper 820 may be coupled to the chunk locator 810 and configured to read each entry of the PPA. The pending-puts helper 820 may be further configured to determine whether the read entry of the PPA has a valid version number. If not, the pending-puts helper 820 may be further configured to assign the global version number to the entry of the PPA.

The value retriever 830 may be coupled to the chunk locator 810 and in communication with the one or more client devices 108. The value retriever 830 may be configured to obtain the key specified in the get request and retrieve the value of the key having the relevant version number stored in the located chunk of the database 120. In an embodiment, the relevant version number associated with the key may be the most recent version number associated with the key that is prior to the time stamp represented by the global version number. In an embodiment, the relevant version number associated with the key may be the largest version number below the updated global version number that is associated with the key. The value retriever 830 may be further configured to output the value of the key in response to the get request, e.g., back to the one or more client devices 108.

Figure 9:
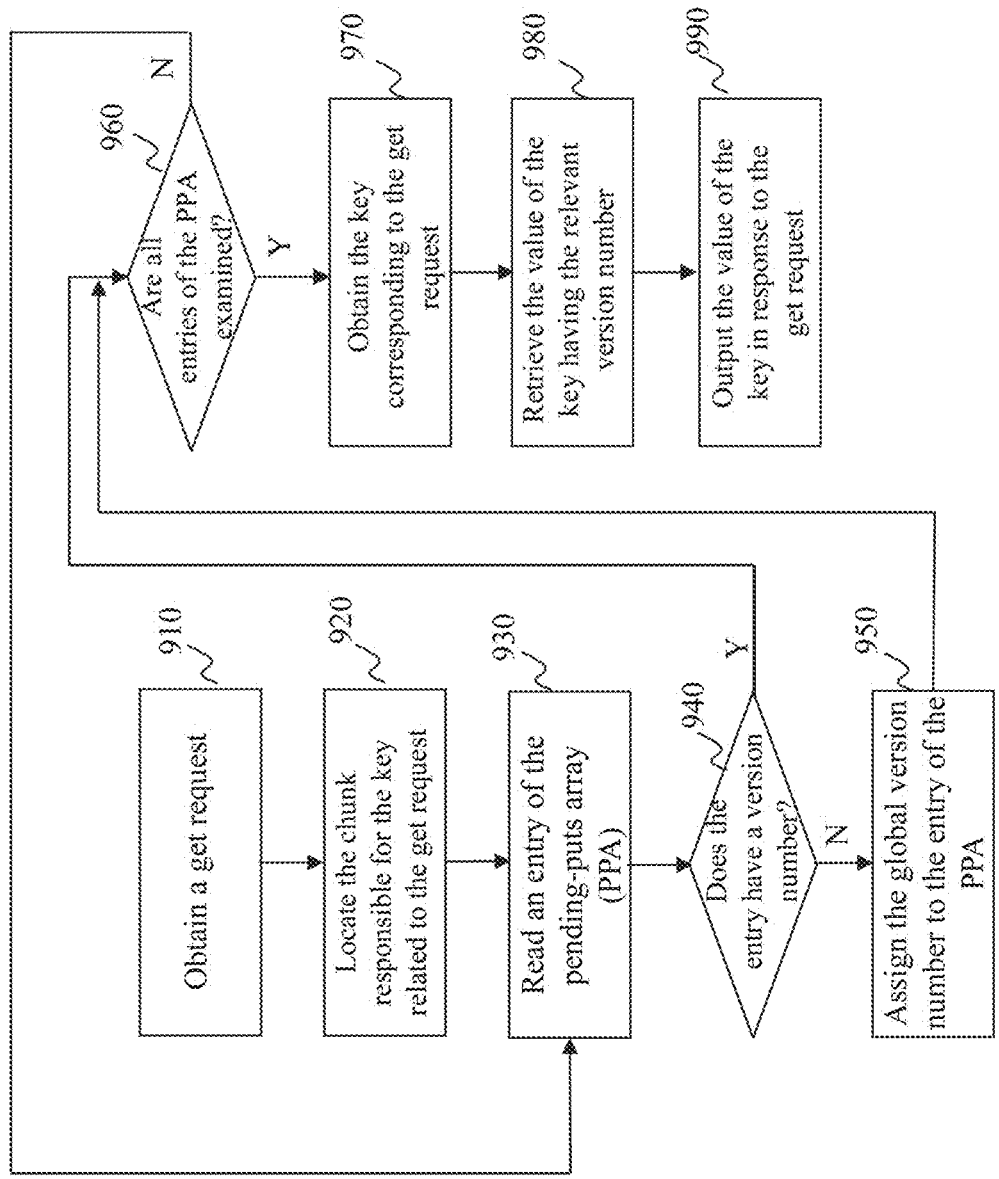
FIG. 9 is a flowchart of an exemplary process for performing a get operation in response to a get request, according to an embodiment of the present teaching.

FIG. 9 is a flowchart of an exemplary process for performing a get operation in response to a get request, according to an embodiment of the present teaching. The process described in FIG. 9 may be performed in the data reader 330. As described above, a plurality of get operations may be performed using the method in FIG. 9 in parallel.

At step 910, a get request may be obtained. The get request may be to retrieve a value associated with a key specified in the get request. At step 920, a chunk that may store the key specified in the scan request (or the entry of the STA) may be located in the data structure (e.g., the data structure in FIG. 5) through index. At step 930, an entry of the PPA may be read. At step 940, it is determined whether the entry of the PPA has a valid version number. If so, the process proceeds to step 960. Otherwise, the process proceeds to step 950.

At step 950, the global version number may be retrieved from the database and assigned to the entry of the PPA. At step 960, it is determined whether all entries of the PPA have been examined. If so, the process proceeds to step 970. Otherwise, the process returns to step 930. Sometimes, the steps 930, 940, 950, and 960 may be collectively referred to a sub-process for helping pending put operations.

At step 970, the key specified in the get request may be obtained. At step 980, the value of the key having the relevant version number stored in the located chunk of the database 120 may be retrieved. In an embodiment, the relevant version number associated with the key may be the most recent version number associated with the key that is prior to the time stamp represented by the global version number. In an embodiment, the relevant version number associated with the key may be the largest version number below the updated global version number that is associated with the key. At step 990, the value of the key may be outputted in response to the get request, e.g., back to the one or more client devices 108.

Figure 10:
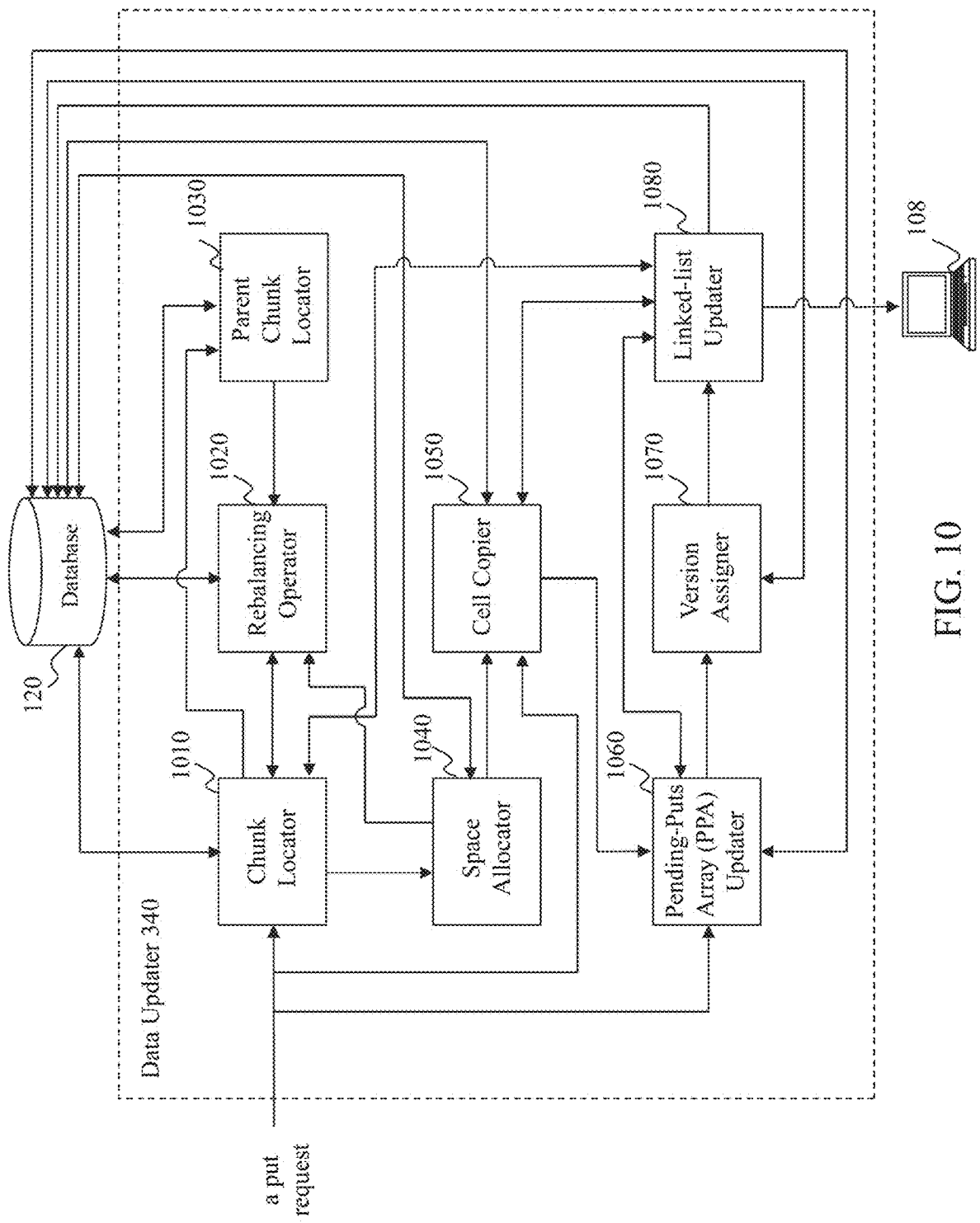
FIG. 10 illustrates an exemplary diagram of a data updater, according to an embodiment of the present teaching.

FIG. 10 illustrates an exemplary diagram of the data updater 340, according to an embodiment of the present teaching. The data updater 340 includes a chunk locator 1010, a rebalancing operator 1020, a parent chunk locator 1030, a space allocator 1040, a cell copier 1050, a pending-puts array updater 1060, a version assigner 1070, and a linked-list updater 1080, all of which are accessible to the database 120.

The chunk locator 1010 may be configured to obtain a put request from the request classifier 310. The put request may be to update the database 120 with the data associated with the key specified in the put request. In an embodiment, the put request may be to add the data associated with the key in the database 120 if the key is absent in the database 120. In an embodiment, the put request may be to update the value of the key in the database 120 based on the data associated with the key if the key exists in the database 120 but has an old value. The chunk locator 1010 may be further configured to locate a chunk to store the key specified in the put request, e.g., in the data structure (e.g., the data structure in FIG. 5) through index. The chunk locator 1010 may further configured to determine whether there is enough space in the chunk to store the key specified in the put request. If not, the chunk locator 1010 may further configured to instruct the rebalancing operator 1020 to rebalance the chunk. After an old chunk is rebalanced and finally replaced with the new chunk, the old chunk may be referred to the "parent chunk" of the new chunk. Accordingly, the new chunk may be referred to as an "infant chunk" (with the status of "INFANT") of the old chunk. If there is enough space in the chunk, the chunk locator 1010 may further configured to determine whether the status of the chunk is "INFANT." If the status of the chunk is "INFANT," the chunk locator 1010 may further configured to instruct the rebalancing operator 1020 and the parent chunk locator 1030 to rebalance the parent chunk of the chunk. If the status of the chunk is not "INFANT," the chunk locator 1010 may further configured to instruct the space allocator 1040 to allocate space for the key in the chunk.

The rebalancing operator 1020 may be coupled to the chunk locator 1010, parent chunk locator 1030, and the space allocator 1040, and configured to rebalance the chunk or the parent chunk of the chunk according to the chunk locator's instruction as described above or the space allocator's instruction as described below. More details about the rebalancing operator 1020 will be discussed in FIGS. 12-13.

The parent chunk locator 1030 may be coupled to the chunk locator 1010 and the rebalancing operator 1020, and configured to determine the parent chunk of the chunk so that the rebalancing operator 1020 may be able to rebalance the parent chunk according to the instruction of the chunk locator 1010 as described above.

The space allocator 1040 may be coupled to the chunk locator 1010, the rebalancing operator 1020, and the cell copier 1050, and configured to allocate a space in the chunk to store the data associated with the key specified in the put request. In an embodiment, the space is allocated by increasing the counter of cells in the chunk. The space allocator 1040 may be further configured to determine whether the space is allocated successfully. If so, the space allocator 1040 may be further configured to instruct the cell copier 1050 to copy the data associated with the key in the allocated space. Otherwise, the space allocator 1040 may be further configured to instruct the rebalancing operator 1020 to rebalance the chunk.

The cell copier 1050 may be coupled to the space allocator 1040, the pending-puts array updater 1060, and the linked-list updater 1080, and configured to copy the data associated with the key that is specified in the put request to the allocated space. In an embodiment, the data may be copied to the allocated space in form of a cell including the key and the value associated with the key.

The pending-puts array updater 1060 may be coupled to the cell copier 1050, the version assigner 1070, and the linked-list updater 1080, and configured publish the put request as an entry in the PPA and determine whether the PPA entry has a valid version number. If so, the pending-puts array updater 1060 may be configured to instruct the version assigner 1070 to assign the version number of the PPA entry to the key when the key does not have a version number in the database 120. Otherwise, the pending-puts array updater 1060 may be configured to instruct the version assigner 1070 to assign the global version number to the PPA entry.

The version assigner 1070 may be coupled to the pending-puts array updater 1060 and the linked-list updater 1080, and configured to retrieve the global version number from the database and assign the global version number to the PPA entry as the version number of the PPA entry according to the pending-puts array updater's instruction. Alternatively, the version assigner 1070 may be configured to assign the version number of the PPA entry to the key according to the pending-puts array updater's instruction as described above when the key does not have a version number in the database 120.

The linked-list updater 1080 may be coupled to the chunk locator 1010, the cell copier 1050, the pending-puts array updater 1060, and the version assigner 1070, and in communication with the one or more client devices 108. The linked-list updater 1080 may be configured to update the chunk's linked list with the copied cell (or data associated with the key specified in the put request) as described above. The linked-list updater 1080 may be further configured to output a confirmation in response to the put request.

Figure 11:
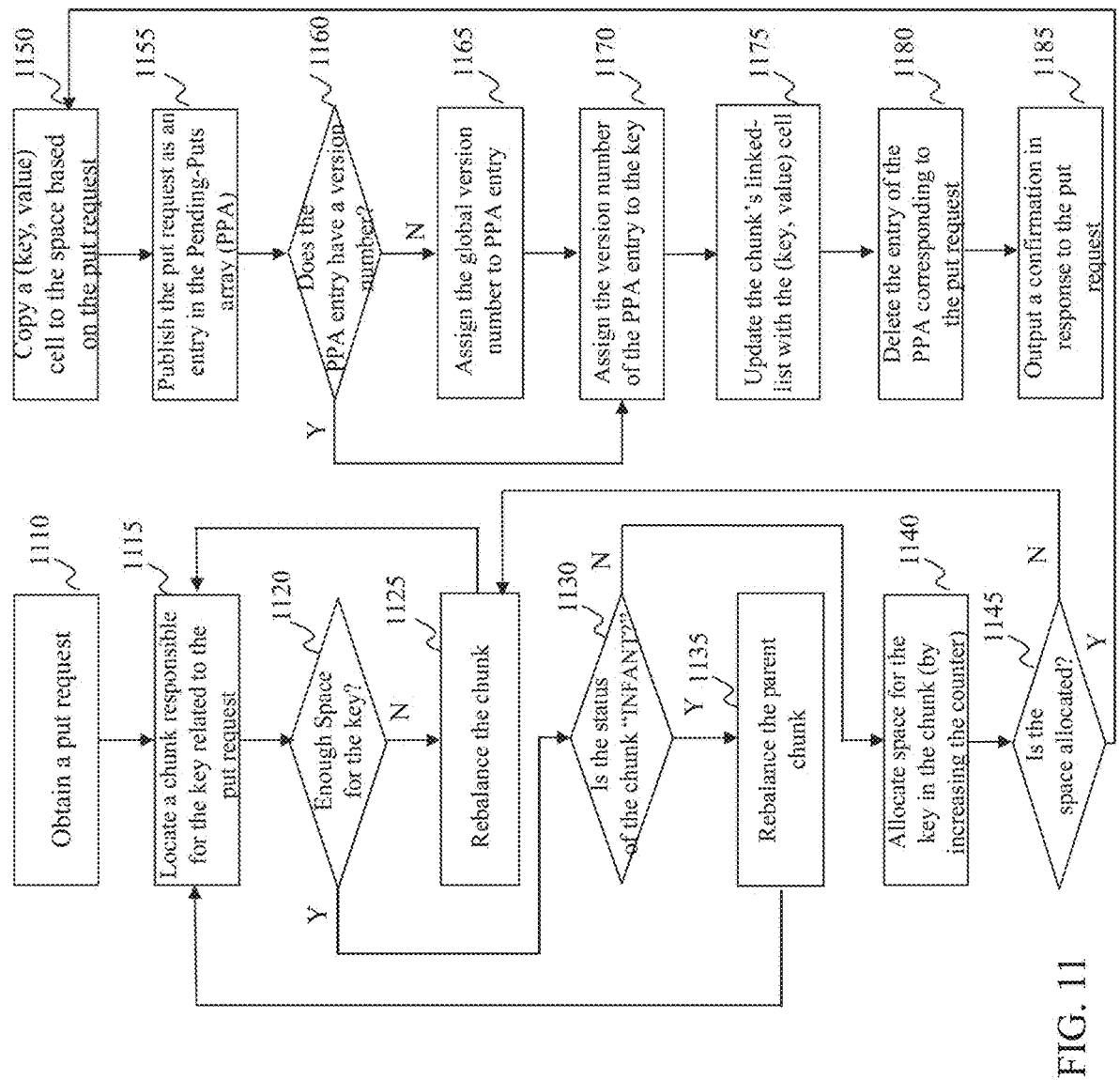
FIG. 11 is a flowchart of an exemplary process for performing a put operation in response to a put request, according to an embodiment of the present teaching.

FIG. 11 is a flowchart of an exemplary process for performing a put operation in response to a put request, according to an embodiment of the present teaching. The process described in FIG. 11 may be performed in the data updater 340. As described above, a plurality of put operations may be performed using the method in FIG. 11 consecutively.

At step 1110, a put request may be obtained. The put request may be to update the database with the data associated with the key specified in the put request. In an embodiment, the put request may be to add the data associated with the key in the database if the key is absent in the database. In an embodiment, the put request may be to update the value of the key in the database based on the data associated with the key if the key exists in the database but has an old value.

At step 1115, a chunk to store the key specified in the put request may be located, e.g., in the data structure (e.g., the data structure in FIG. 5) through index. At step 1120, it is determined whether there is enough space in the chunk to store the key specified in the put request. If so, the process proceeds to step 1130. Otherwise, the process proceeds to step 1125.

At step 1125, the chunk is rebalanced. After an old chunk is rebalanced and finally replaced with the new chunk, the old chunk may be referred to the "parent chunk" of the new chunk. Accordingly, the new chunk may be referred to as an "infant chunk" (with the status of "INFANT") of the old chunk. More details about step 1125 will be described in FIGS. 12 and 13. At step 1130, it is determined whether the status of the chunk is "INFANT." If so, the process proceeds to step 1135. Otherwise, the process proceeds to step 1140.

At step 1135, the parent chunk of the chunk may be determined and rebalanced. Then the process returns to step 1115. At step 1140, space is allocated in the chunk to store the data associated with the key specified in the put request. In an embodiment, the space is allocated by increasing the counter of cells in the chunk.

At step 1145, it is determined whether the space is allocated successfully. If so, the process proceeds to step 1150. Otherwise, the process returns to step 1125. At step 1150, the data associated with the key that is specified in the put request may be copied to the allocated space. In an embodiment, the data may be copied to the allocated space in form of a cell including the key and the value associated with the key. At step 1155, the put request may be published as an entry in the PPA. At step 1160, it is determined whether the PPA entry has a valid version number. If so, the process proceeds to step 1170. Otherwise, the process proceeds to step 1165. At step 1165, the global version number may be retrieved from the database and assigned to the PPA entry as the version number of the PPA entry. At step 1170, the version number of the PPA entry may be assigned to the key when the key does not have a version number in the database. At step 1175, the chunk's linked list may be updated with the copied cell (or data associated with the key specified in the put request) as described at step 1150. At step 1180, the entry of the PPA corresponding to the put request may be deleted. At step 1185, a confirmation may be outputted in response to the put request upon completion of the put operation.

Figure 12:
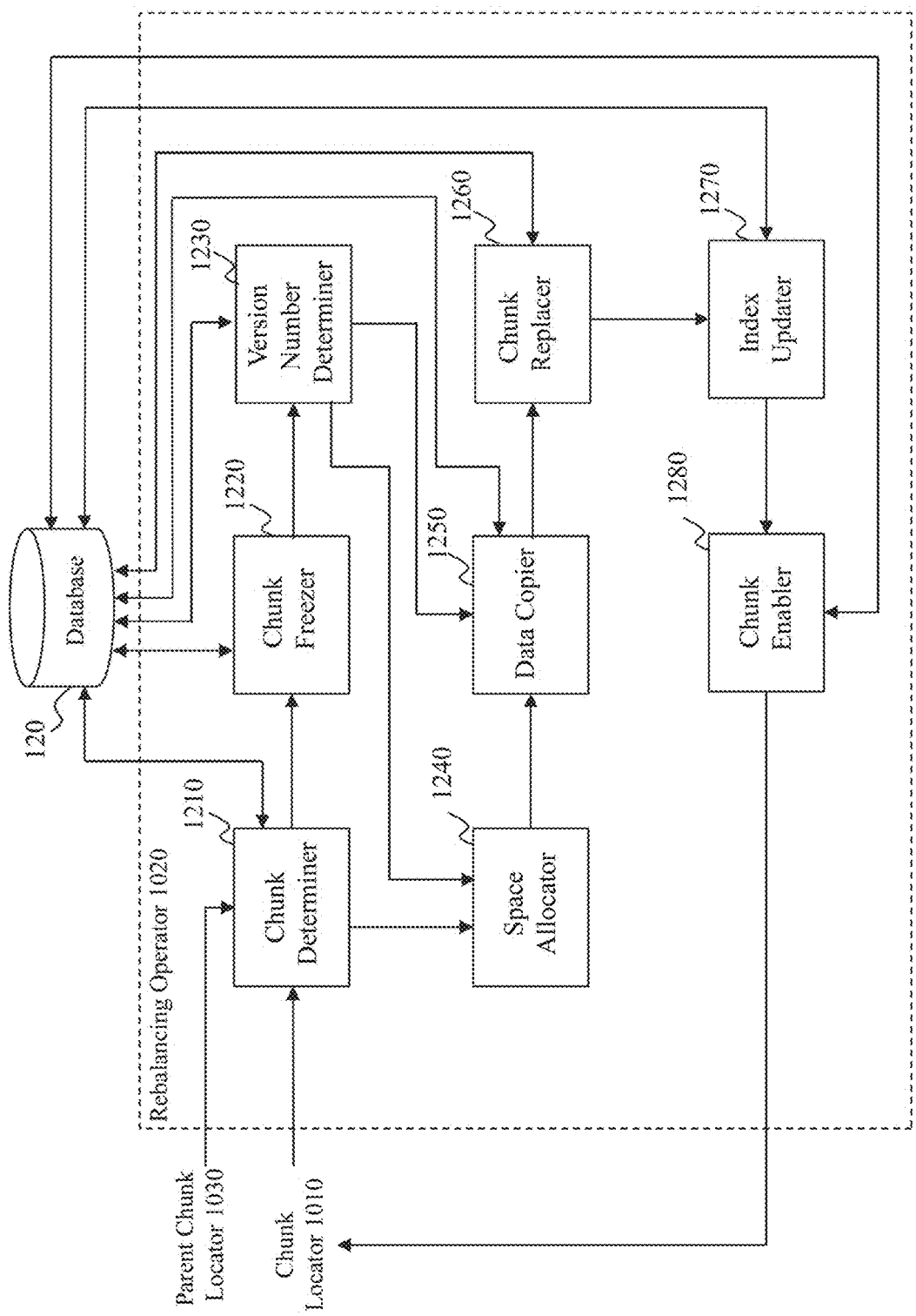
FIG. 12 illustrates an exemplary diagram of a rebalancing operator, according to an embodiment of the present teaching.

FIG. 12 illustrates an exemplary diagram of the rebalancing operator 1020, according to an embodiment of the present teaching. The rebalancing operator 1020 may include a chunk determiner 1210, a chunk freezer 1220, a version number determiner 1230, a space allocator 1240, a data copier 1250, a chunk replacer 1260, an index updater 1270, and a chunk enabler 1280, all of which are accessible to the database 120.

The chunk determiner 1210 may be in communication with the parent chunk locator 1030 and the chuck locator 1010, and coupled to the chuck freezer 1320, and the space allocator 1340. The chunk determiner 1210 may be configured to determine one or more chunks to engage. The chunk freezer 1220 may be coupled to the chunk determined 1210 and the version number determiner 1230, and configured to freeze the one or more chunks so that the one or more chunks are immutable.

The version number determiner 1230 may be coupled to the chunk freezer 1220, the space allocator 1240, and the data copier 1250, and configured to determine a minimal version number to keep for each key in the one or more chunks such that the data associated with each key having version numbers below the corresponding determined minimal version number will be removed after the rebalance operation. In an embodiment, the minimal version number for each key may be the minimal number of the global version number and the version numbers of all STA entries including the key.

The space allocator 1240 may be coupled to the chunk determiner 1210, the version number determiner 1230, and the data copier 1250, and configured to allocate a space (i.e., memory or storage) for one or more new chunks. The one or more chunks determined by the chuck determiner 1210 may be referred to as one or more "parent chunks" of the one or more new chunks. Accordingly, the one or more new chunks may be referred to as one or more "infant chunks" (with the status of "INFANT") of the one or more chunks determined by the chuck determiner 1210.

The data copier 1250 may be coupled to the space allocator 1240, the version number determiner 1230, and the chunk replacer 1260, and configured to copy the keys and values in the one or more chucks determined by the chuck determiner 1210 based on the determined version numbers to the allocated space. As described above, only the keys and values in the one or more old chucks associated with the version numbers no less than the corresponding determined minimal version numbers may be copied to the allocated space.

The chunk replacer 1260 may be coupled to the data copier 1250 and the index updater 1270, and configured to replace the one or more chunks determined by the chuck determiner 1210 with the one or more new chunks in the linked list. The index updater 1270 may be coupled to the chunk replacer 1260 and the chunk enabler 1280, and configured to update the index of the data structure based on the updated linked list so that the one or more chunks determined by the chuck determiner 1210 are removed from the index and the one or more new chunks can be accessible directly from the index. The chunk enabler 1280 may be coupled to the index updater 1270 and configured to enable the one or more new chunks to be mutable. Optionally, the chuck enabler 1280 may be further configured to instruct the chuck locator 1010 to operate.

Figure 13:
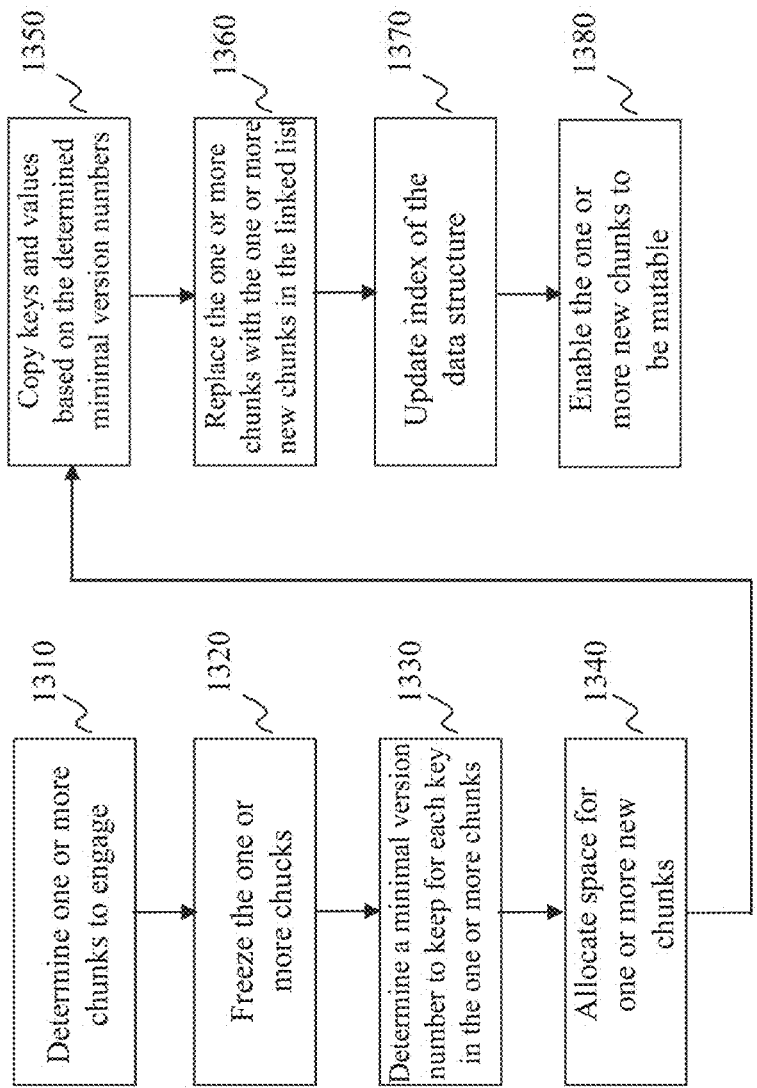
FIG. 13 is a flowchart of an exemplary process for performing a rebalance operation, according to an embodiment of the present teaching.

FIG. 13 is a flowchart of an exemplary process for performing a rebalance operation, according to an embodiment of the present teaching. The process described in FIG. 13 may be performed in the rebalancing operator 1020.

At step 1310, one or more chunks to engage may be determined. At step 1320, the one or more chunks may be frozen so that the one or more chunks are immutable. At step 1330, a minimal version number to keep for each key in the one or more chunks may be determined such that the data associated with each key having version numbers below the corresponding determined minimal version number will be removed after the rebalance operation. In an embodiment, the minimal version number for each key may be the minimal number of the global version number and the version numbers of all STA entries including the key.

At step 1340, a space (i.e., a memory or a storage) may be allocated for one or more new chunks. The one or more old chunks at step 1310 may be referred to as one or more "parent chunks" of the one or more new chunks. Accordingly, the one or more new chunks may be referred to as one or more "infant chunks" (with the status of "INFANT") of the one or more old chunks at step 1310.

At step 1350, the keys and values based on the determined minimal version numbers may be copied to the allocated space. As described above, only the keys and values associated with the version numbers no less than the corresponding determined minimal version numbers may be copied to the allocated space.

At step 1360, the one or more chunks may be replaced with the one or more new chunks in the linked list. At step 1370, the index of the data structure may be updated based on the updated linked list so that the one or more chunks are removed from the index and the one or more new chunks can be accessible directly from the index. At step 1380, the one or more new chunks may be enabled to be mutable.

Figure 14:
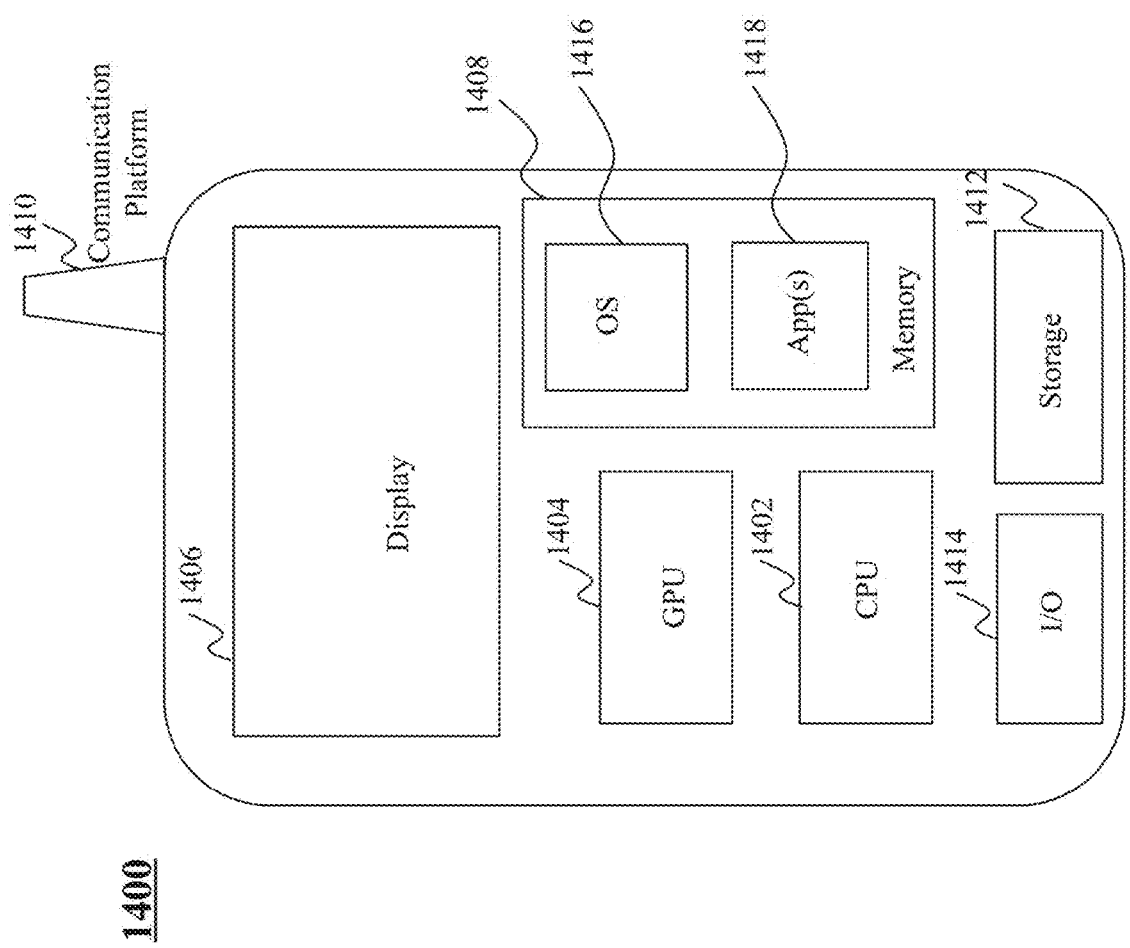
FIG. 14 depicts a general mobile device architecture on which the present teaching can be implemented.

FIG. 14 depicts the architecture of a mobile device which can be used to realize a specialized system implementing the present teaching. In this example, the client devices 108 and/or the database operation engine 104 may be the mobile device 1400, including, but is not limited to, a smart phone, a tablet, a laptop, a wearable computing device (e.g., eyeglasses, wrist watch, etc.), or in any other form factor. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1414. Any other suitable component, including but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. User interactions with the device 1400 may be achieved via the I/O devices 1414.

To implement various modules, units, and their functionalities described in the present disclosure, computer hardware platforms may be used as the hardware platform(s) for one or more of the elements described herein (e.g., the client devices 108, the database operation engine 104, the request classifier 310, the data scanner 320, the data reader 330, and the data updater 340 with respect to FIGS. 1-13). The hardware elements, operating systems and programming languages of such computers are conventional in nature, and it is presumed that those skilled in the art are adequately familiar therewith to adapt those technologies for concurrent database operation as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 15:
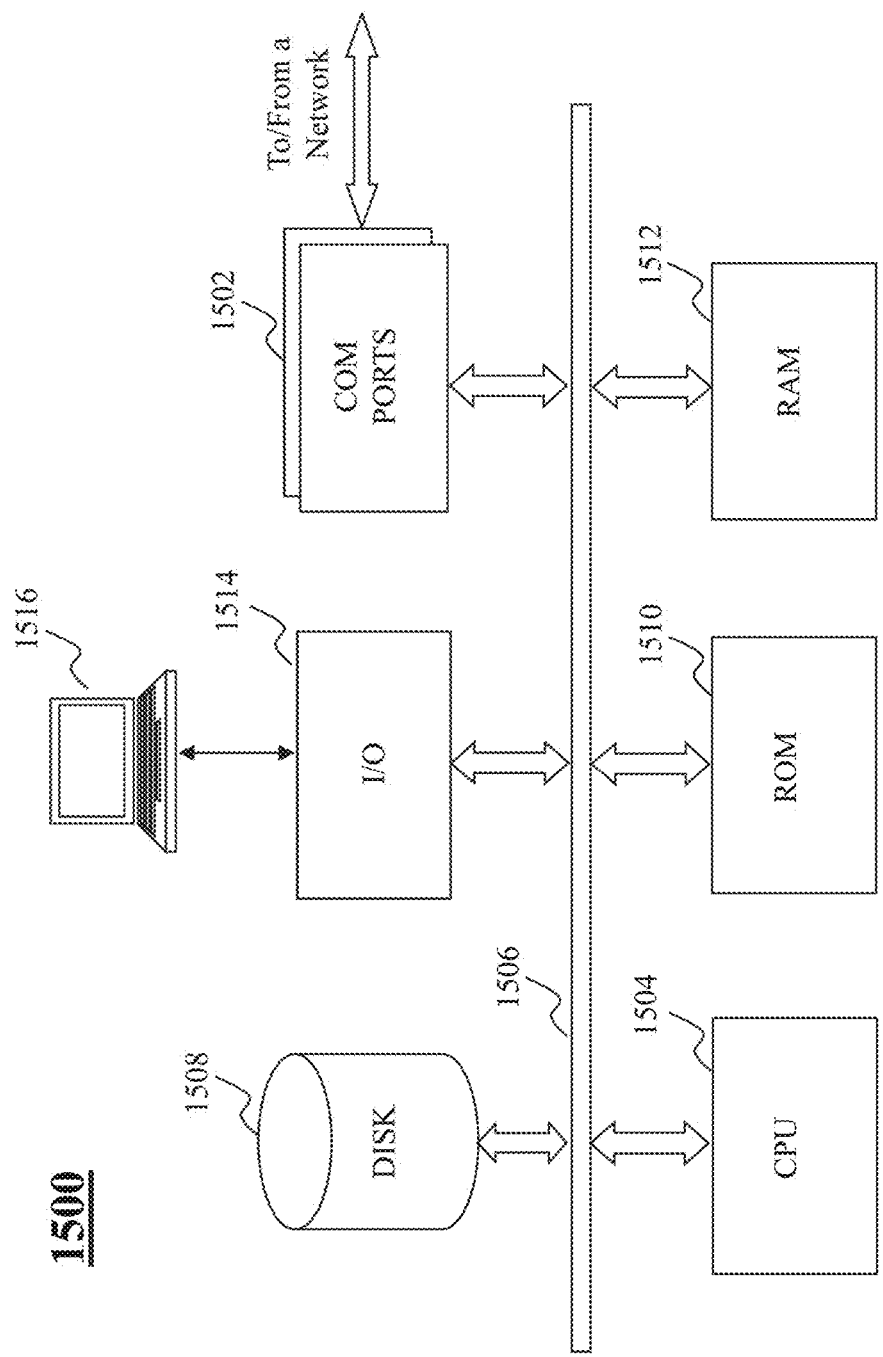
FIG. 15 depicts a general computer architecture on which the present teaching can be implemented.

FIG. 15 depicts the architecture of a computer which can be used to realize a specialized system implementing the present teaching. Such a specialized system incorporating the present teaching has a functional block diagram illustration of a hardware platform which includes user interface elements. The computer 1500 may be a general purpose computer or a special purpose computer. Both can be used to implement a specialized system for the present teaching. This computer 1500 may be used to implement any component of the systems 100 and 200 as described herein. For example, the client devices 108, the database operation engine 104, and any of the components of the database operation engine 104, i.e., the data scanner 320, the data reader 330, and the data updater 340 may be implemented on a computer such as the computer 1500, via its hardware, software program, firmware, or a combination thereof. Although only one such computer is shown, for convenience, the computer functions relating to concurrent database operations as described herein may be implemented in a distributed fashion on a number of similar platforms, to distribute the processing load.

The computer 1500, for example, includes COM ports 1502 connected to and from a network connected thereto to facilitate data communications. The computer 1500 also includes a central processing unit (CPU) 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU. The computer 1500 also includes an I/O component 1514, supporting input/output flows between the computer and other components therein such as user interface elements 1516. The computer 1500 may also receive programming and data via network communications.

Hence, aspects of the methods of concurrent database operation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with key exchange techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the key exchange as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for database operation, the method comprising:
receiving, concurrently, a plurality of requests which includes a scan request to obtain first data associated with a plurality of keys stored in a database, wherein the scan request specifies to retrieve all values of keys between a first key and a second key;
updating, upon receipt of the scan request, a global version number associated with the plurality of keys before performing the scan requested;
obtaining, after the global version number is updated, with respect to each of the plurality of keys, the first data associated with the plurality of keys based on the updated global version number by:
determining a relevant version number of the key, and retrieving a value of the key associated with the relevant version number, wherein the first data comprises the value retrieved for each of the plurality of keys; and
providing the first data in response to the scan request.

2. The method of claim 1, wherein updating the global version number comprises:
retrieving the global version number in the database; and
increasing the global version number to obtain the updated global version number.

3. The method of claim 2, wherein the relevant version number is a largest version number below the updated global version number that is associated with each of the plurality of keys in the database.

4. The method of claim 1, wherein the plurality of requests includes a get request to retrieve second data associated with a key specified in the get request, the method further comprises:
obtaining the second data associated with the key specified in the get request based on the updated global version number; and
providing the second data in response to the get request.

5. The method of claim 4, wherein obtaining the second data associated with the key specified in the get request based on the updated global version number comprises:
determining a relevant version number for the key specified in the get request, wherein the relevant version number is a largest version number below the updated global version number that is associated with the key specified in the get request in the database; and
retrieving a value of the key specified in the get request associated with the relevant version number.

6. The method of claim 1, wherein the plurality of requests includes a put request to update the database with second data associated with a key specified in the put request, the method further comprises:

updating the database with the second data associated with the key specified in the put request; and
transmitting a confirmation in response to the put request.

7. The method of claim 6, further comprising:
when the put request is not associated with a first version number, assigning the global version number to be the first version number associated with the put request; and
associating the first version number with the key specified in the put request in the database when the key specified in the put request does not have a version number in the database.

8. A system, having at least one processor, storage, and a communication platform connected to a network for database operation, the system comprising:
a request classifier configured to:
receive, concurrently, a plurality of requests; and
classify each of the plurality of requests into one of a scan request to obtain first data associated with a plurality of first keys stored in a database, a get request to obtain second data associated with a second key stored in the database, and a put request to update the database with third data associated with a third key, wherein the plurality of requests includes the scan request, and wherein the scan request specifies to retrieve all values of keys between a first key and a second key; and
a data scanner configured to:
receive the scan request from the request classifier;
update, upon receipt of the scan request, a global version number associated with the plurality of first keys before performing the scan requested;
obtaining, after the global version number is updated, with respect to each of the plurality of keys, the first data associated with the plurality of keys based on the updated global version number by:
determining a relevant version number of the key, and retrieving a value of the key associated with the relevant version number, wherein the first data comprises the value retrieved for each of the plurality of keys; and
providing the first data in response to the scan request.

9. The system of claim 8, wherein the global version number being updated comprises the data scanner being configured to:
retrieve the global version number in the database; and
increase the global version number to obtain the updated global version number.

10. The system of claim 9, wherein the relevant version number is a largest version number below the updated global version number that is associated with each of the plurality of first keys in the database.

11. The system of claim 8, wherein the plurality of requests includes a get request to retrieve second data associated with a second key specified in the get request, and wherein the system further comprises a data reader configured to:
obtain the second data associated with the second key specified in the get request based on the updated global version number; and
provide the second data in response to the get request.

12. The system of claim 11, wherein the second data associated with the second key specified in the get request based on the updated global version number being obtained comprises the data reader being configured to:
determine a relevant version number for the second key specified in the get request, wherein the relevant version number is a largest version number below the updated global version number that is associated with the second key specified in the get request in the database; and retrieve a value of the second key specified in the get request associated with the relevant version number.

13. The system of claim 8, wherein the plurality of requests includes a put request to update the database with third data associated with a third key specified in the put request, and the system further comprises a data updater configured to:

update the database with the third data associated with the third key specified in the put request; and transmit a confirmation in response to the put request.

14. The system of claim 13, wherein the data updater is further configured to:

when the put request is not associated with a first version number, assign the global version number to be the first version number associated with the put request; and associate the first version number with the third key specified in the put request in the database when the third key specified in the put request does not have a version number in the database.

15. A machine-readable tangible and non-transitory medium having information for database operation, when read by a machine, effectuate operations comprising:

receiving, concurrently, a plurality of requests which includes a scan request to obtain first data associated with a plurality of keys stored in a database, wherein the scan request specifies to retrieve all values of keys between a first key and a second key;

updating, upon receipt of the scan request, a global version number associated with the plurality of keys before performing the scan requested;

obtaining, after the global version number is updated, with respect to each of the plurality of keys, the first data associated with the plurality of keys based on the updated global version number by:

determining a relevant version number of the key, and retrieving a value of the key associated with the relevant version number, wherein the first data comprises the value retrieved for each of the plurality of keys; and providing the first data in response to the scan request.

16. The machine-readable tangible and non-transitory medium of claim 15, wherein updating the global version number comprises:

retrieving the global version number in the database; and increasing the global version number.

17. The machine-readable tangible and non-transitory medium of claim 16, wherein the relevant version number is a largest version number below the updated global version number that is associated with each of the plurality of keys.

18. The machine-readable tangible and non-transitory medium of claim 15, wherein the plurality of requests includes a get request to retrieve second data associated with a key specified in the get request, the operations further comprise:

obtaining the second data associated with the key specified in the get request based on the updated global version number; and providing the second data in response to the get request.

19. The machine-readable tangible and non-transitory medium of claim 18, wherein obtaining the second data associated with the key specified in the get request based on the updated global version number comprises:

determining a relevant version number for the key specified in the get request, wherein the relevant version number is a largest version number below the updated global version number that is associated with the key specified in the get request in the database; and retrieving a value of the key specified in the get request associated with the relevant version number.

20. The machine-readable tangible and non-transitory medium of claim 15, wherein the plurality of requests includes a put request to update the database with second data associated with a key specified in the put request, the operations further comprise:

updating the database with the second data associated with the key specified in the put request;

when the put request is not associated with a first version number, assigning the global version number to be the first version number associated with the put request; and associating the first version number with the key specified in the put request in the database when the key specified in the put request does not have a version number in the database.

* * * * *